(12) United States Patent
Konkle

(10) Patent No.: US 8,680,475 B2
(45) Date of Patent: Mar. 25, 2014

(54) DIGITAL X-RAY DETECTOR ASSEMBLY WITH ELASTOMERIC BACKSCATTER SHIELD

(75) Inventor: Nicholas Ryan Konkle, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/569,925

(22) Filed: Aug. 8, 2012

(65) Prior Publication Data

US 2014/0042331 A1 Feb. 13, 2014

(51) Int. Cl.
 *G01T 1/24* (2006.01)
(52) U.S. Cl.
 USPC .................................................. 250/370.09
(58) Field of Classification Search
 USPC ............................ 250/370.01, 370.09, 370.11
 See application file for complete search history.

(56) References Cited

U.S. PATENT DOCUMENTS

| | | | |
|---|---|---|---|
| 5,198,685 | A | 3/1993 | Kitani et al. |
| 6,323,891 | B1 | 11/2001 | Kitani et al. |
| 6,548,177 | B2 | 4/2003 | Hieda et al. |
| 7,317,190 | B2 | 1/2008 | Ertel et al. |
| 7,745,797 | B1 | 6/2010 | Liu et al. |
| 2007/0085015 | A1* | 4/2007 | Castleberry .............. 250/370.09 |
| 2010/0284521 | A1 | 11/2010 | McBroom et al. |
| 2011/0133085 | A1 | 6/2011 | Konkle et al. |
| 2011/0133096 | A1 | 6/2011 | Konkle et al. |
| 2012/0119098 | A1 | 5/2012 | Konkle et al. |

FOREIGN PATENT DOCUMENTS

EP 0943931 A2 9/1999

OTHER PUBLICATIONS

U.S. Appl. No. 13/308,354, filed Nov. 30, 2011, Konkle et al.
U.S. Appl. No. 13/308,369, filed Nov. 30, 2011, Konkle et al.
U.S. Appl. No. 13/342,745, filed Jan. 3, 2012, Konkle et al.
Scuderi, Gaetano J., et al.; "Evaluation of non-lead-based protective radiological material in spinal surgery," The Spine Journal 6, 2006; 577-582.
International Search Report/Written Opinion of the International Searching Authority; PCT/US2013052007; mailing date of Nov. 25, 2013.

\* cited by examiner

*Primary Examiner* — Mark R Gaworecki
(74) *Attorney, Agent, or Firm* — Fletcher Yoder, P.C.

(57) ABSTRACT

Portable digital X-ray detectors are provided. One X-ray detector includes an outer assembly and a detector assembly disposed within the outer assembly. The detector assembly includes an imager having a scintillator that converts radiographic energy to light and a detector array having one or more detector elements that detect the light from the scintillator. The detector assembly also includes electronic circuitry mounted on at least one printed circuit board and adapted to control operation of the imager during data acquisition and readout. Further, an elastomeric assembly is disposed between the imager and the electronic circuitry, and the elastomeric assembly is configured to absorb backscattered X-rays that pass through the imager or deflect off of a portion of the outer assembly during an X-ray exposure.

18 Claims, 2 Drawing Sheets

DIGITAL X-RAY DETECTOR ASSEMBLY WITH ELASTOMERIC BACKSCATTER SHIELD

BACKGROUND OF THE INVENTION

The subject matter disclosed herein generally relates to digital imaging systems and, more particularly, to assemblies of a portable digital X-ray detector for use in such systems.

A number of radiological imaging systems of various designs are known and are presently in use. Such systems generally are based upon generation of X-rays that are directed toward a subject of interest. The X-rays traverse the subject and impact a film or a digital detector. In medical diagnostic contexts, for example, such systems may be used to visualize internal tissues and diagnose patient ailments. In other contexts, parts, baggage, parcels, and other subjects may be imaged for a variety of purposes, such as to assess their contents, among other things.

Increasingly, such X-ray systems use digital circuitry, such as solid-state detectors, for detecting the X-rays, which are attenuated, scattered or absorbed by the intervening structures of the subject. Solid-state detectors may generate electrical signals indicative of the intensities of received X-rays. These signals, in turn, may be acquired and processed to reconstruct images of the subject of interest.

Conventional construction of digital X-ray detectors may result in a relatively heavy and thick digital X-ray detector, in part to protect fragile components that can be highly susceptible to damage by physical impact or shock. Typically, the digital X-ray detector also includes a relatively stiff enclosure, which rigidly attaches to the internal components. However, as digital X-ray imaging systems have become increasingly widespread, digital X-ray detectors have become more portable for greater versatility. With the advent of portable digital X-ray detectors comes a need for lighter, thinner, smaller detectors that retain the imaging capabilities of conventional detectors. Unfortunately, constructing a portable X-ray detector that is economically desirable, geometrically thin, and of a light mass may present unique challenges associated with thermal management, shock absorption, and backscattered X-ray absorption. Accordingly, there exists a need for improved X-ray detector assemblies that address these drawbacks.

BRIEF DESCRIPTION OF THE INVENTION

In one embodiment, a portable digital X-ray detector is provided. The X-ray detector includes an outer assembly and a detector assembly disposed within the outer assembly. The detector assembly includes an imager having a scintillator that converts radiographic energy to light and a detector array having one or more detector elements that detect the light from the scintillator. The detector assembly also includes electronic circuitry mounted on at least one printed circuit board and adapted to control operation of the imager during data acquisition and readout. Further, an elastomeric assembly is disposed between the imager and the electronic circuitry, and the elastomeric assembly is configured to absorb backscattered X-rays that pass through the imager or deflect off of a portion of the outer assembly during an X-ray exposure.

In another embodiment, a method of manufacturing a portable X-ray detector is provided. The method includes providing an outer assembly and disposing an imager in the outer assembly. The imager includes a scintillator that converts radiographic energy to light and a detector array having one or more detector elements that detect the light from the scintillator. The method also includes providing electronic circuitry mounted on at least one printed circuit board and adapted to control operation of the imager during data acquisition and readout. Further, the method also includes disposing an elastomeric assembly between the imager and the electronic circuitry. The elastomeric assembly is configured to absorb backscattered X-rays that pass through the imager or deflect off of a portion of the outer assembly during an X-ray exposure.

In another embodiment, a portable digital X-ray detector includes an outer assembly and a detector assembly disposed within the outer assembly. The detector assembly includes an imager having a scintillator that converts radiographic energy to light and a detector array having one or more detector elements that detect the light from the scintillator. Electronic circuitry is mounted on at least one printed circuit board and adapted to control operation of the imager during data acquisition and readout. Further, an elastomeric assembly is disposed between the imager and the electronic circuitry, and the elastomeric assembly is configured to absorb backscattered X-rays that pass through the imager or deflect off of a portion of the outer assembly during an X-ray exposure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As described in detail below, provided herein are embodiments of portable digital X-ray detectors having an elastomeric assembly disposed therein. In certain embodiments, the elastomeric assembly may be disposed between an imager and an electronics board for the absorption of backscattered X-rays, thus reducing or eliminating the likelihood that the electronics are undesirably imaged. That is, in certain embodiments, the inclusion of the elastomeric assembly may provide for the absorption of X-rays that pass through a portion of the imager without being converted to light energy, as well as X-rays that deflect off of the casing of the portable X-ray detector. Further, the elastomeric assembly may also provide for the absorption of shock applied to the casing of the X-ray detector. Accordingly, in certain embodiments, the elastomeric assembly may include at least one metal having X-ray blocking properties and at least one polymer having elastic properties. The metal and the polymer may be combined in the elastomeric assembly in a variety of suitable ways. For example, in one embodiment, the metal (or metals) may be provided in powder form, and the powdered metals may be incorporated into a copolymer matrix to provide the elastomeric assembly.

The foregoing features may offer one or more advantages over conventional systems that do not incorporate an elastomeric assembly into the portable digital X-ray detector. For example, in some embodiments, the inclusion of the elastomeric assembly, as well as its positioning between the imager and the electronics, may enable the portable X-ray detector to be geometrically thin and of a low mass, while still providing shock isolation and backscatter absorption capabilities. Further, in some embodiments, the elastomeric assembly may utilize metals other than lead, thus providing for X-ray blocking without the use of lead and reducing or eliminating the need for lead in the X-ray detector assembly. Still further, in certain embodiments a heat spreader may be included for the spreading of heat along a width of the portable X-ray detector assembly.

Figure 1:
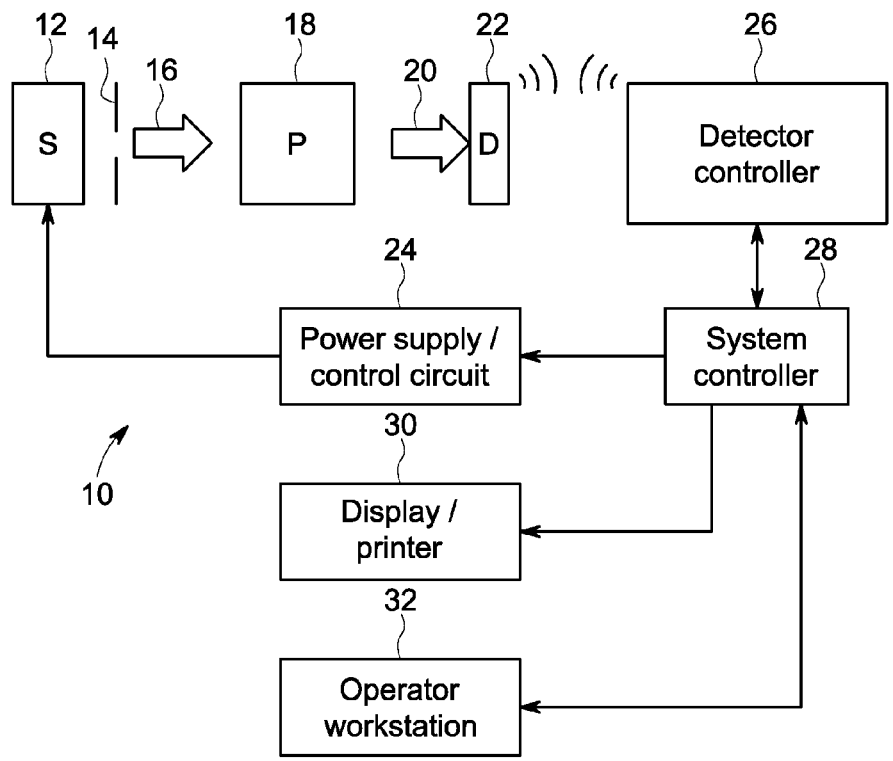
FIG. 1 is a diagrammatical overview of a digital X-ray imaging system in accordance with a presently disclosed embodiment.

Turning now to the drawings, FIG. 1 illustrates diagrammatically an imaging system 10 for acquiring and processing discrete pixel image data. In the illustrated embodiment, the imaging system 10 is a digital X-ray system designed both to acquire original image data and to process the image data for display in accordance with the present technique. In the embodiment illustrated in FIG. 1, the imaging system 10 includes a source of X-ray radiation 12 positioned adjacent to a collimator 14. The collimator 14 permits a stream of radiation 16 to pass into a region in which an object or subject, such as a patient 18, is positioned. A portion of the radiation 20 passes through or around the subject and impacts a digital X-ray detector, represented generally at reference numeral 22. As will be appreciated by those skilled in the art, the detector 22 may convert the X-ray photons incident on its surface to lower energy photons, and subsequently to electric signals, which are acquired and processed to reconstruct an image of the features within the subject.

Further, in certain embodiments, as discussed in more detail below, the detector 22 may be a portable digital X-ray detector. As appreciated by one skilled in the art, in some instances, the design considerations associated with portable digital X-ray detectors may be different than those of detectors associated with fixed systems. For example, packaging parameters, such as thermal management and shock isolation, as well as the monetary cost, geometric dimensions, and overall mass of the detector assembly may be of increased consideration in the design of portable detectors as compared to fixed detectors. For further example, because portable X-ray detectors are designed for increased amounts of movement both to and between use locations as compared to fixed X-ray detectors, factors such as overall mass and the ability to absorb shock may be of increased importance. That is, the desired reduction in size and mass, among other things, may lead to different design considerations.

As described in more detail below, in some embodiments, the detector 22 may be a portable digital X-ray detector having an elastomeric assembly disposed therein. The elastomeric assembly may be positioned between an imager portion of the assembly and an electronic board for the absorption of backscattered X-rays and/or the absorption of shock. Accordingly, in certain embodiments, the elastomeric assembly may include at least one metal having X-ray blocking properties and at least one polymer having elastic properties, and the metal and polymer may be combined in any desired fashion to create the elastomeric assembly. These and other features of the portable digital X-ray detector embodiments provided herein are discussed in more detail below.

In the embodiment illustrated in FIG. 1, the radiation source 12 is controlled by a power supply/control circuit 24, which supplies both power and control signals for examination sequences. Moreover, the detector 22 is communicatively coupled to a detector controller 26 which commands acquisition of the signals generated in the detector 22. In some embodiments, such as embodiments in which the detector 22 is portable and configured for use with a variety of systems, the detector 22 may communicate with the detector controller 26 via a suitable wireless communication standard. However, it should be noted that the use of detectors 22 that communicate with the detector controller 26 through a cable or some other wired connection are also envisaged. The detector controller 26 may execute various signal processing and filtration functions, such as for initial adjustment of dynamic ranges, interleaving of digital image data, and so forth.

Both the power supply/control circuit 24 and the detector controller 26 are responsive to signals from a system controller 28. In general, the system controller 28 commands operation of the imaging system 10 to execute examination protocols and to process acquired image data. In the present context, the system controller 28 also includes signal processing circuitry, typically based upon a programmed general purpose or application-specific digital computer; and associated manufactures, such as optical memory devices, magnetic memory devices, or solid-state memory devices, for storing programs and routines executed by a processor of the computer to carry out various functionalities, as well as for storing configuration parameters and image data, interface circuits, and so forth. In one embodiment, a general or special purpose computer system may be provided with hardware, circuitry, firmware, and/or software for performing the functions attributed to one or more of the power supply/control circuit 24, the detector controller 26, and/or the system controller 28 as discussed herein.

In the embodiment illustrated in FIG. 1, the system controller 28 is linked to at least one output device, such as a display or printer, as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
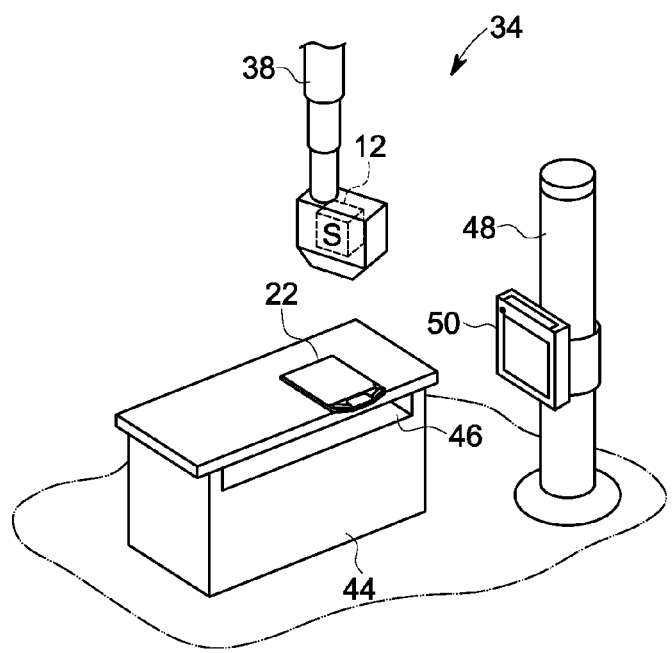
FIG. 2 is a perspective view of the digital X-ray imaging system of FIG. 1 in accordance with one embodiment.

By way of further example, a perspective view of an imaging system 34 is provided in FIG. 2 in accordance with one embodiment. The imaging system 34 includes an overhead tube support arm 38 for positioning a radiation source 12, such as an X-ray tube, with respect to a patient 18 and a detector 22. It is also noted that, in addition to the radiation source 12, the imaging system 34 may also include any or all of the other components described above with respect to FIG. 1, such as the system controller 28.

Moreover, in one embodiment, the imaging system 34 may be used with one or both of a patient table 44 and a wall stand 48 to facilitate image acquisition. Particularly, the table 44 and the wall stand 48 may be configured to receive one or more digital detectors 22. For instance, a digital detector 22 may be placed on the upper surface of the table 44, and the patient 18 (more specifically, an anatomy of interest of the patient 18) may be positioned on the table 44 between the detector 22 and the radiation source 12. In some other instances, the detector 22 may be positioned in a slot 46 below the upper surface of the table 44 and the patient 18, or the radiation source 12 and the detector 22 may be positioned horizontally about the patient 18 for cross-table imaging. Further, the wall stand 48 may include a receiving structure 50 also adapted to receive the digital detector 22, and the patient 18 may be positioned adjacent the wall stand 48 to enable image data to be acquired via the digital detector 22.

In one embodiment, the imaging system 34 may be a stationary system disposed in a fixed X-ray imaging room, such as that generally depicted in, and described above with respect to FIG. 2. It will be appreciated, however, that the presently disclosed techniques may also be employed with other imaging systems, including mobile X-ray units and systems, in other embodiments. For instance, in other embodiments, a mobile X-ray unit may be moved to a patient recovery room, an emergency room, a surgical room, or the like to enable imaging of a patient without requiring transport of the patient to a dedicated (i.e., fixed) X-ray imaging room. Further, as noted above, the X-ray detector 22 may be a portable digital X-ray detector configured for use with both mobile or fixed systems. That is, in certain embodiments, the imaging system 34 may be fixed, but the detector 22 may still be portable and configured for use with a variety of fixed imaging systems. Indeed, the detector 22 may be portable and still configured for use with fixed or mobile imaging systems.

Figure 3:
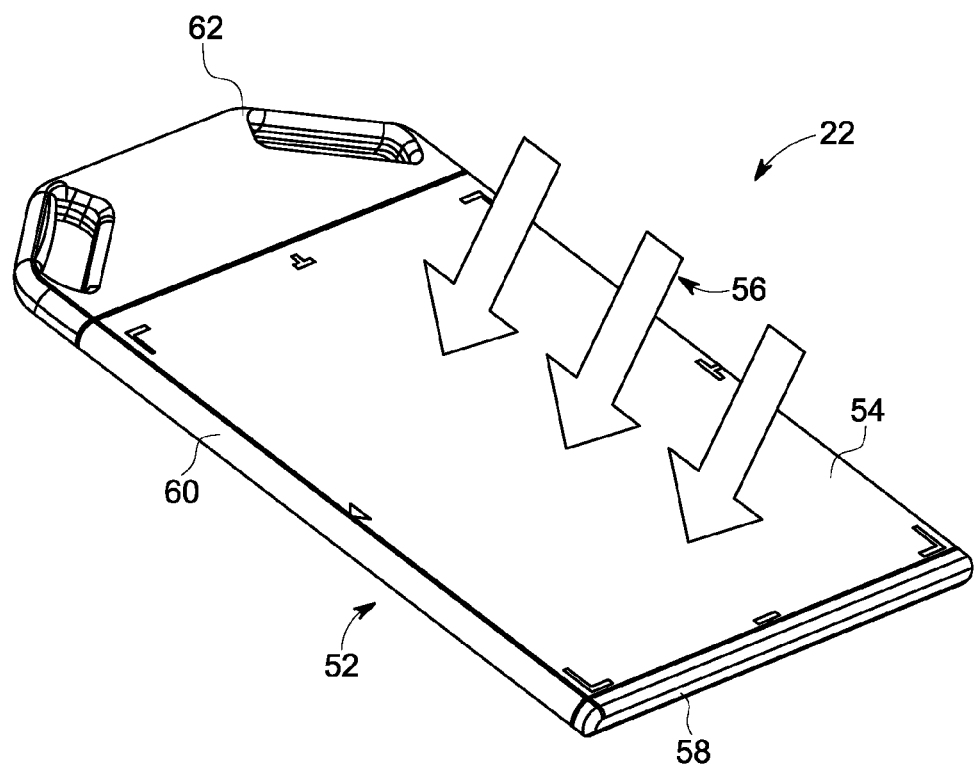
FIG. 3 is a front perspective view of a portable digital X-ray detector that may be utilized in the digital X-ray imaging system of FIG. 1 in accordance with an embodiment.

A perspective view of an embodiment of a flat panel, portable, digital X-ray detector 22 suitable for use in the foregoing imaging systems is provided in FIG. 3. The illustrated portable, digital X-ray detector 22 includes a detector subsystem for generating electrical signals in response to reception of incident X-rays. In accordance with certain embodiments, an outer assembly 52 provides an external enclosure surrounding the detector panel assembly, so as to provide a barrier around the detector components, thereby providing an outer that directly experiences an external load or an impact. In addition, as discussed in further detail below, the detector 22 may also include shock absorbent structures, such as an elastomeric assembly, to partially or fully protect the internal components within the outer assembly 52. Further, it should be noted that the shock absorbent structures may also serve other purposes and provide additional functionality within the assembly. For example, in one embodiment, the elastomeric assembly may provide both shock absorbance as well as backscatter shielding.

In one embodiment, the outer assembly 52 may be a single-piece continuous structure and may be substantially devoid of any discontinuities. For example, the single-piece outer assembly 52 may be a 4-5 sided structure in a sleeve like configuration having at least one opening to allow for insertion of the detector panel assembly. The illustrated outer assembly 52 includes a front side 54 to receive X-ray radiation 56. It should be noted that the individual sides or edges of the single-piece sleeve may be flat, rounded, curved, contoured, or otherwise shaped to improve detector ruggedness and ease of use.

Alternatively, in other embodiments, the outer assembly 52 may be a multi-piece assembly. The outer assembly 52 may be formed of materials such as a metal, a metal alloy, a plastic, a composite material, or a combination of the above. In certain embodiments, the material has low X-ray attenuation characteristics. In one embodiment, the outer assembly 52 may be formed of a lightweight, durable composite material such as a carbon fiber reinforced plastic material, carbon reinforced plastic material in combination with foam cores, or a graphite fiber-epoxy composite. Some embodiments may include one or more material compositions having a non-conductive matrix with conductive elements disposed therein, and may provide electromagnetic interference shielding to protect the internal components of the detector 22 from external electronic noise. Additionally, the outer assembly 52 may be designed to be substantially rigid with minimal deflection when subjected to an external load.

In certain embodiments, an end cap 58 may be provided at one end of an outer enclosure 60 to form the outer assembly 52. It should be noted that the end cap 58 may be formed of an impact resistant, energy absorbent material such as nylon, polyethylene, ultra high molecular weight polyethylene (UHMW-PE), delrin, or polycarbonate. UHMW polyethylene is a linear polymer with a molecular weight generally in the range of about 3,100,000 to about 6,000,000. Further, a handle 62 may be mechanically coupled to the outer assembly 52 to facilitate the portability of the detector 22. This handle 62 may be a separate component that is attached to the outer assembly 52. Again, it should be noted that the handle 62 may be formed of an impact resistant, energy absorbent material, such as a high molecular weight polyethylene.

The handle 62 may, in turn, include various features that facilitate handling of the detector 22 by a technician or other user. In some embodiments, such as that depicted in FIG. 3, the handle 62 may include one or more grips, although it is noted that other features, such as contours allowing a user to more easily grip the detector 22, may also or instead be included in other embodiments. Further, although the detector 22 depicted in the embodiment of FIG. 3 includes the handle 62, which renders the detector 22 portable, in other embodiments, other features of the detector 22 may impart portability upon the assembly. Indeed, the currently envisioned portable X-ray detectors are subject to a variety of implementation-specific variations and are not limited to those that are configured as shown. The illustrated detectors are merely examples of suitable portable X-ray detectors within which an elastomeric assembly may be disposed.

As shown, the detector 22 may be constructed without a fixed tether or cable. Alternatively, the detector 22 may be connected to a tether that is used to connect the detector readout electronics to the data acquisition system of the scanner when in use. When not in use, the detector 22 may be easily detached from tether and stored remotely from the imaging system, or transported to another location for use in another imaging system. As such, detector 22 may be transported to and from multiple scan stations remote from one another. This is particularly advantageous for emergency rooms and other triage facilities.

Figure 4:
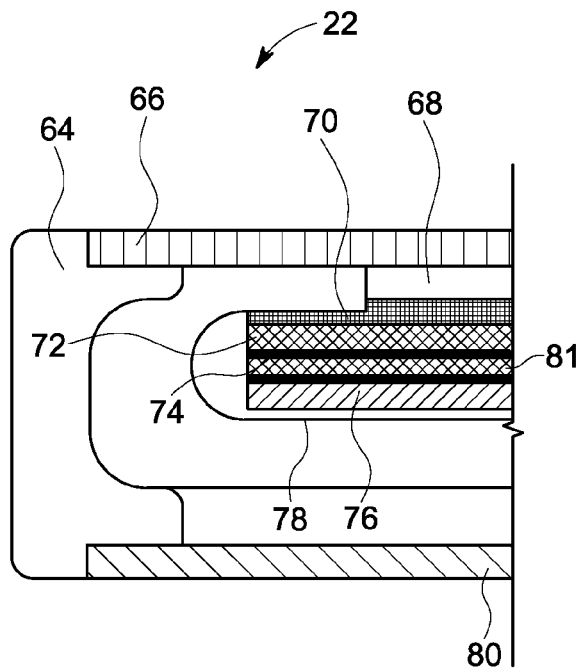
FIG. 4 is a cross-sectional view of the portable X-ray detector of FIG. 3 in accordance with an embodiment.

FIG. 4 is a partial cross-sectional view of the portable X-ray detector 22 of FIG. 3, illustrating an example of a suitable internal composition of the detector 22. As shown, the illustrated embodiment includes an enclosure 64, which may be part of the outer assembly 52, and an X-ray window 66, through which X-rays may enter the assembly 22. The assembly 22 also includes isolation foam 68, an imager 70, an elastomeric assembly 72, a heat spreader 74, electronic circuitry 76, flex electronics 78, and a rear enclosure 80, which may be part of outer assembly 52.

During operation, the detector assembly 22 receives radiation that passes through or around a subject, such as a patient, to impact the detector 22. The components provided in the detector 22 then cooperate to convert the X-ray photons incident on its surface to lower energy photons, and subsequently to electric signals, which are acquired and processed to reconstruct an image of the features within the subject. To that end, the imager 70 may include a scintillator that converts radiographic energy to light and emits light proportional to the quantity and energy of the received X-rays. Accordingly, light emissions may be higher in regions of the scintillator where more X-rays were received or the energy level of the X-rays was higher. Because the composition of the subject being imaged will attenuate the X-rays projected by the X-ray source, a non-uniform amount of light emission across the scintillator layer may be achieved, and this variation in light emission may be used to capture contrast in the reconstructed image of the subject.

The imager 70 may further include a detector array that detects the light produced by the scintillator. In certain embodiments, the detector array may include a plurality of detector elements, each corresponding to a pixel in the reconstructed image of the subject being imaged. Each detector element may include a light sensitive region and an electronics region, and a capacitor in the electronics region may couple to readout electronics that enable the electrical output of the detector elements to be communicated to other system components to facilitate the downstream image reconstruction process. Generally, a thin and fragile glass substrate supports the transistors of the detector elements.

Further, the electronic circuitry 76 in the assembly 22 is generally provided to control operation of the imager 70 during data acquisition and readout. To that end. The electronic circuitry 76 may include one or more electronic components mounted on one or more printed circuit boards (PCBs). For example, the circuitry 76 may include light emitting diodes (LEDs) for monitoring and diagnostics, temperature sensors, accelerometer support electronics, one or more data storage devices, wireless transmission electronics, energy storage devices, and so forth.

As shown in FIG. 4, the elastomeric assembly 72 is provided between the imager 70 and the support member 81, and, during operation, the elastomeric assembly 72 may provide multiple functionalities. For example, the elastomeric assembly 72 may absorb impact and distribute static load between the imager 70 and the electronic circuitry 76. Further, the elastomeric assembly 72 may also reduce or eliminate the detection of backscattered X-rays. That is, the elastomeric assembly 72 may absorb backscattered X-rays that passed through the imager 70 or deflected off a portion of the outer assembly 52. The foregoing feature may reduce or eliminate the likelihood that the electronic circuitry 76 is imaged. Still further, the elastomeric assembly 72 may thermally isolate the imager 70, which may be temperature sensitive, from the electronic circuitry 76, which may dissipate heat during operation. It should be noted that by providing a single assembly, i.e., the elastomeric assembly 72, having these multiple functionalities, the overall dimensions, mass, and monetary cost of certain embodiments of the portable X-ray detector 22 may be reduced as compared to conventional designs. Further, it should also be noted that the support member 81 and electronic circuitry 76 may be the same component in some embodiments.

The foregoing functionalities may be supported by a variety of suitable structural arrangements of the elastomeric assembly 72. In one embodiment, the elastomeric assembly 72 includes at least one metal having X-ray blocking properties and at least one polymer having elastic properties. When combined, the metal (or metals) and the polymer (or polymers) provide the benefits of both types of materials. In certain embodiments, the metal component of the elastomeric assembly 72 may include antimony, bismuth, barium sulfate, tungsten, a combination thereof, or any other suitable X-ray blocking metal. Further, in some embodiments, the metal component of the assembly 72 may not include lead. Additionally, the polymeric component of the elastomeric assembly 72 may include ethylene vinyl acetate (EVA), or any other suitable polymer.

Further, the metal component and the polymer component of the elastomeric assembly 72 may be combined in any suitable manner. For example, in one embodiment, the metal component may be provided in powder form, the polymer component may be provided as a copolymer matrix, and the elastomeric assembly 72 may be formed by filling the copolymer matrix with the powder. For further example, in one embodiment, the elastomeric assembly 72 may be Xenolite TB, available from Lite Tech, Inc., having a weight of less than approximately 6 kg/square meter, and being formed by incorporating bismuth and antimony into an EVA copolymer matrix.

Additionally, as shown in FIG. 4, the heat spreader 74 may optionally be provided between the elastomeric assembly 72 and the electronic circuitry 76, depending on implementation-specific considerations. In embodiments in which the heat spreader 74 is provided, the heat spreader 74 spreads heat along a width of the outer assembly 52 during operation. However, the heat spreader 74 may be configured not to spread heat toward the electronic circuitry 76. The heat spreader 74 may include materials, such as graphite, that facilitate the spreading of heat in the desired directions (i.e. in the in-plane direction). In some embodiments, the heat spreader 74 may include materials such as eGRAF, manufactured by Graff ech.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A portable digital X-ray detector, comprising:
   an outer assembly; and
   a detector assembly disposed within the outer assembly, the detector assembly comprising:
   an imager comprising a scintillator configured to convert radiographic energy to light and a detector array comprising one or more detector elements configured to detect the light from the scintillator;
   electronic circuitry mounted on at least one printed circuit board and configured to control operation of the imager during data acquisition and readout; and
   an elastomeric assembly disposed between the imager and the electronic circuitry and comprising at least one metal having X-ray blocking properties and at least one polymer having elastic properties, wherein the elastomeric assembly is configured to absorb backscattered X-rays that pass through the imager or deflect off of a portion of the outer assembly during an X-ray exposure and wherein the elastomeric assembly is configured to thermally isolate the imager from the electronic circuitry.

2. The detector of claim 1, wherein the elastomeric assembly comprises a lead free elastomeric assembly.

3. The detector of claim 1, wherein the at least one metal of the elastomeric assembly comprises antimony, bismuth, barium sulfate, tungsten, or a combination thereof.

4. The detector of claim 1, wherein the at least one polymer of the elastomeric assembly comprises an ethylene vinyl acetate (EVA) copolymer matrix.

5. The detector of claim 1, wherein the elastomeric assembly comprises bismuth, antimony, and an ethylene vinyl acetate (EVA) copolymer matrix.

6. The detector of claim 1, wherein the detector assembly comprises a heat spreader disposed between the elastomeric assembly and the electronic circuitry, the heat spreader is configured to spread heat along a width of the outer assembly.

7. The detector of claim 6, wherein the heat spreader comprises graphite.

8. The detector of claim 1, wherein the elastomeric assembly is configured to absorb shock applied to the outer assembly.

9. The detector of claim 1, wherein the at least one metal of the elastomeric assembly comprises a powder, the at least one polymer comprises a copolymer matrix, and the elastomeric assembly comprises the copolymer matrix filled with the powder.

10. The detector of claim 1, wherein the elastomeric assembly has a weight of less than approximately 6 kg/square meter.

11. A method of manufacturing a portable X-ray detector, comprising:
providing an outer assembly;
disposing an imager in the outer assembly, wherein the imager comprises a scintillator configured to convert radiographic energy to light and a detector array comprising one or more detector elements configured to detect the light from the scintillator;
providing electronic circuitry mounted on at least one printed circuit board and configured to control operation of the imager during data acquisition and readout;
disposing an elastomeric assembly between the imager and the electronic circuitry configured to absorb backscattered X-rays that pass through the imager or deflect off of a portion of the outer assembly during an X-ray exposure; and
disposing a heat spreading material between the elastomeric assembly and the electronic circuitry.

12. The method of claim 11, wherein providing the elastomeric assembly comprises incorporating at least one metal having X-ray blocking properties with at least one polymer having elastic properties.

13. The method of claim 11, wherein providing the elastomeric assembly comprises incorporating the at least one metal in powder form into the at least one polymer in the form of a copolymer matrix.

14. The method of claim 11, wherein providing the elastomeric assembly comprises incorporating bismuth and antimony into an ethylene vinyl acetate (EVA) copolymer matrix.

15. The method of claim 11, comprising providing a support member adjacent the electronic circuitry.

16. The method of claim 11, comprising providing a carbon fiber support member adjacent the electronic circuitry.

17. A portable digital X-ray detector, comprising:
an outer assembly; and
a detector assembly disposed within the outer assembly and comprising:
an imager comprising a scintillator configured to convert radiographic energy to light and a detector array comprising one or more detector elements configured to detect the light from the scintillator;
electronic circuitry mounted on at least one printed circuit board and configured to control operation of the imager during data acquisition and readout;
an elastomeric assembly disposed between the imager and the electronic circuitry configured to absorb backscattered X-rays that pass through the imager or deflect off of a portion of the outer assembly during an X-ray exposure; and
a heat spreader disposed between the elastomeric assembly and the electronic circuitry, wherein the heat spreader is configured to spread heat along a width of the outer assembly.

18. The detector of claim 17, and wherein the elastomeric assembly comprises at least one metal having X-ray blocking properties and at least one polymer having elastic properties.

* * * * *